July 30, 1929.  W. G. ZIEGLER  1,722,619
THERMOMETER
Filed July 17, 1923    2 Sheets-Sheet 1
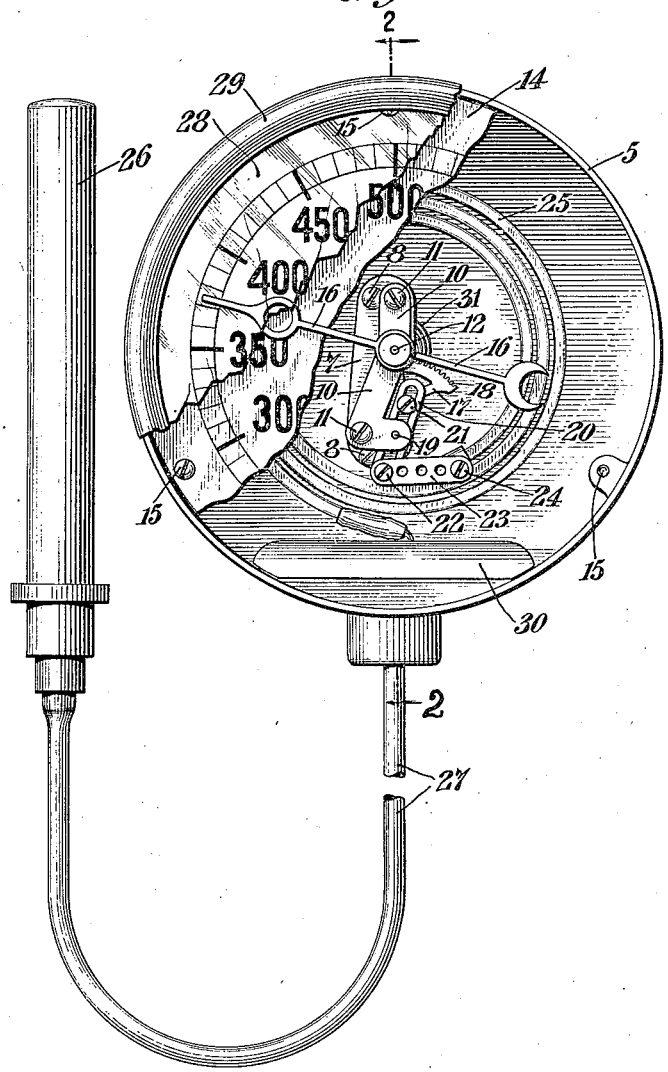
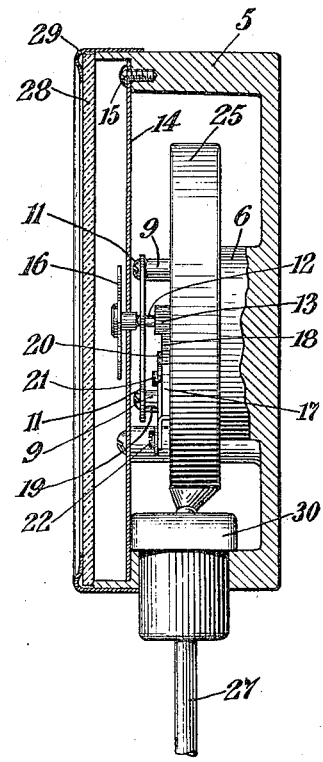
Inventor
William G. Ziegler
By his Attorneys
Ward, Crosby + Smith

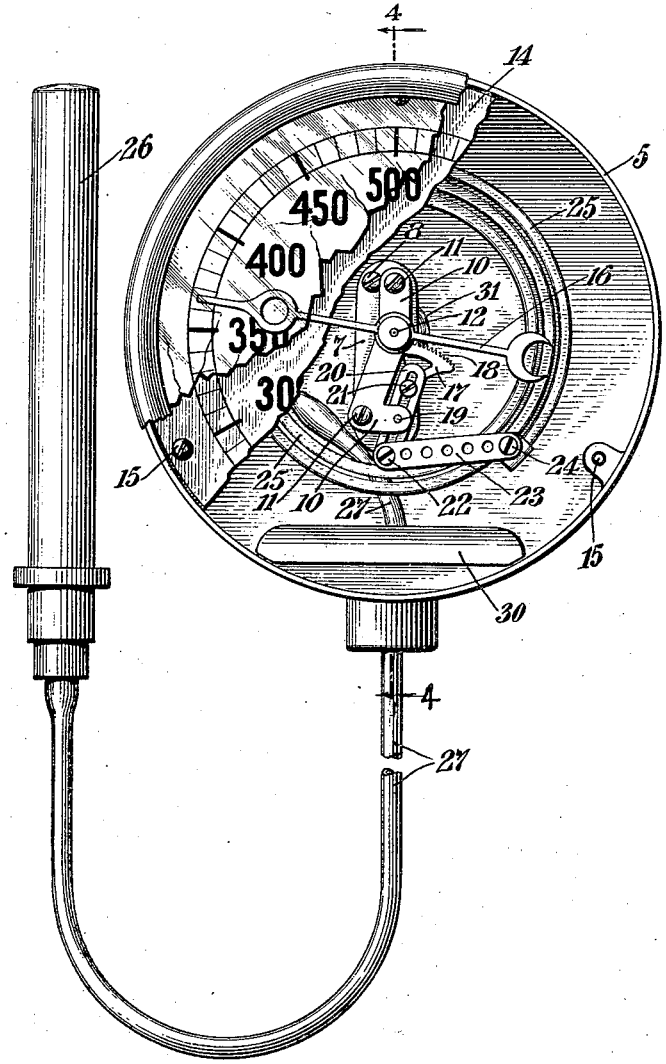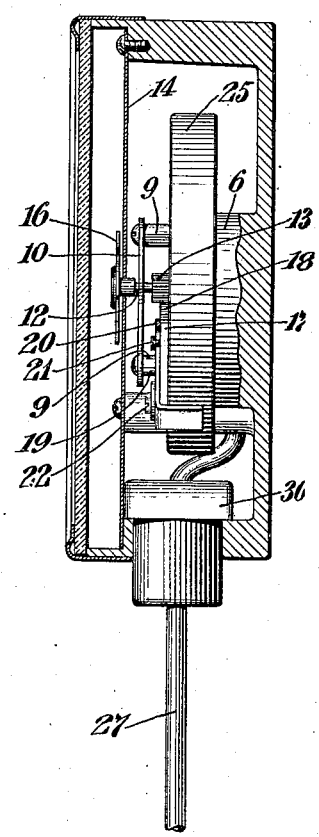

Patented July 30, 1929.

1,722,619

UNITED STATES PATENT OFFICE.

WILLIAM G. ZIEGLER, OF ELMHURST, NEW YORK, ASSIGNOR, BY MESNE ASSIGNMENTS, TO CONSOLIDATED ASHCROFT HANCOCK COMPANY, INC., OF NEW YORK, N. Y., A CORPORATION OF DELAWARE.

THERMOMETER.

Application filed July 17, 1923. Serial No. 652,026.

My invention relates to improvements in thermometers and more particularly to fluid expansion operated dial thermometers. The main object of the invention is to provide a thermometer of this class which is very compact, and simple, and efficient in construction and operation and still sensitive and accurate.

Further and more specific objects, features and advantages will more clearly appear from the detail description given below taken in connection with the accompanying drawings which form a part of this specification.

In the drawings, Fig. 1 is a face view of a thermometer embodying my improvements in a preferred form, certain parts being shown broken away in order to more clearly illustrate others. Fig. 2 is a side view partly illustrating a section taken substantially along the line 2—2 of Fig. 1. Fig. 3 is a view similar to Fig. 1 showing a modified form. Fig. 4 is a side view partly illustrating a section taken substantially along the line 4—4 of Fig. 3.

Referring to Fig. 1, 5 represents a suitable cup-shaped casting having an internal protuberance 6 integral therewith to which is adjustably secured by screws 8, a brass plate 7. Rigidly secured to the brass plate 7 are posts 9 and rigidly secured to the outer ends of the posts 9 and secured therebetween is a brass plate 10, the same being secured to the posts 9 and plate 7 by screws 11. Journaled in the plates 7 and 10 is an arbor 12 having thereon a toothed wheel or pinion 13 which arbor 12 extends through the plate 10 and through the dial 14 secured to the cup frame 5 at its edges by screws 15. The arbor 12 has secured to it at its outer end an indicating pointer 16 cooperating with the dial 14 which has thereon a numerical scale for indicating the temperature. Also journaled between the plates 7 and 10 at 19 is a gear segment 17 provided with rack teeth 18 meshing with the teeth of the wheel 13. Adjustably secured to the front of the gear segment 17 is a slotted member 20, the member 20 being adjustably but rigidly secured to the member 17 by screw 21. To the outer end of the member 20 is pivotally attached at 22 one end of a link 23, the other end of which is pivotally connected at 24 to the inner end of a relatively flat hollow expansion spring 25. The link 23 is provided with a plurality of apertures whereby it may be adjustably secured to the member 20 and the spring 25 respectively. The flat hollow expansion spring 25 comprises a spring having a plurality of turns, wound one outside of another and about another, the outer end of which spring is rigidly held in the supporting structure at 30. 26 represents a metal bulb which is in communication with the hollow spring 25 by means of a hollow tube 27. The front of the apparatus is enclosed by glass plate 28 held in position by a circumferential metallic rim 29.

The bulb 26, tube 27 and spring 25 are filled with an expansible liquid, preferably mercury, and in operation the bulb 26 is placed in the locality, the temperature of which is to be measured. As shown in the drawings the volume of the spring is relatively small as compared with the volume of the bulb. That is, the volume of mercury in the bulb is relatively large as compared with that in the capillary tube 27 and spring 25, the latter being flattened out so that the space therein to be occupied by the mercury is relatively small. An increase in temperature causes the fluid in the bulb 26, tube 27 and hollow spring to expand and increase in volume throughout the system 26, 27, 25 which tends to expand or open up the spring thereby causing the inner and movable end of the spring at 24 to move in a counter-clockwise direction as viewed in Fig. 1, whereupon a similar movement of the link 23 is obtained which swings the gear segment 17 in a counter-clockwise direction as viewed in Fig. 1, which, through its connection with the toothed wheel 13 and arbor 12 causes the indicating pointer 16 to move in a clockwise direction an amount corresponding to the increase in temperature, and so, when the parts are properly adjusted indicates the temperature to which the bulb 26 is subjected.

With such an apparatus it is, of course, impossible to subject all the mercury or other expansible liquid to the same temperature changes, and in order to reduce the error due thereto in such a thermometer depending upon the expansion of a liquid as distinguished from the expansion of a gas, I provide the spring 25 with a plurality of turns so as to obtain a relatively long and large spring which has more power and with which a larger bulb may be used, which in turn reduces the error due to the temperature along the capillary tubing 27. By using such a spring with a plurality of turns the movement of the free end of the spring and pointer is correspondingly increased whereby the arrangement is more sensitive and suitable for indicating temperatures at the bulb with great accuracy. And in order that such a relatively large spring of several turns may be accommodated in a compact apparatus of small size, I place the thermometer mechanical movement comprising the parts 7, 8, 9, 10, 11, 12, 13, 17, 18, 19 and 20 centrally of the spring 25, generally speaking or so that it is substantially surrounded by the spring. That is, the mechanical movement including the amplifying gearing connecting the spring with the pointer is located substantially within an imaginary cylinder co-axially arranged with and surrounded by the turns of the spring 25, and the axis of the pointer is also journaled on an axis extending within the turns of the spring, which axis is at right angles to the dial, the dial being arranged in a plane substantially parallel with the general plane of the spring and the turns of the spring being wound one outside of and about another and all arranged in substantially the same plane. In this manner a relatively large spring of several turns may be used so as to secure greater accuracy with the use of an expansible liquid such as mercury as the operating fluid, and yet the apparatus may be made relatively small and compact without deleteriously affecting the thermometric efficiency of the parts.

The arrangement shown in Figs. 3 and 4 is substantially the same as that shown in Figs. 1 and 2 except that the link 23 is connected to the outer end of the spring 25, while the inner end of the spring 25 is connected to the tube 27 and bulb 26. In this modification, I have also shown a hair spring 31, one end of which is connected to the arbor 12 and the other end to the framework 7, etc., for the purpose of taking up slack or back-lash between the rack 18 and pinion 13 and so keep the pointer movement steady.

While I have described my improvements in great detail and with respect to preferred forms thereof, I do not desire to be limited to such details and forms since many changes and modification may be made and the invention embodied in widely different forms without departing from the spirit and scope thereof in its broader aspects.

What I claim as new and desire to secure by Letters Patent is:

1. A thermometer having in combination, a coiled expansion spring, one end of which is fixed, said spring being hollow and filled with mercury, change in volume of which causes the coils of the spring to expand and move the other end of the spring, a bulb and a tube filled with mercury communicating with the mercury in said hollow spring, said tube operatively connecting the bulb with the fixed end of the expansion spring, and the volume of the spring and tube being relatively small as compared with the volume of said bulb, a dial, an indicating member cooperating with the dial, and means including amplifying gearing operatively connecting the spring with the indicating member, said spring having a plurality of turns, which, in combination with the amplifying gearing, greatly increases the movement of the pointer for a given change in volume of the mercury in the bulb, and the coils of said spring all lying in substantially the same planes and being wound spirally one outside of and about another and arranged substantially coaxial with the dial and the indicating member being journalled about an axis extending within the turns of the spring whereby, at the same time, a more compact arrangement of parts is obtained without deleteriously affecting the thermometric efficiency of the device.

2. A thermometer having in combination, a coiled expansion spring, one end of which is fixed, said spring being hollow and filled with mercury, change in volume of which causes the coils of the spring to expand and move the other end of the spring, a bulb and a tube filled with mercury communicating with the mercury in said hollow spring, said tube operatively connecting the bulb with the fixed end of the expansion spring, a dial, an indicating member cooperating with the dial, and means including amplifying gearing operatively connecting the spring with the indicating member, said spring having a plurality of turns, which, in combination with the amplifying gearing, greatly increases the movement of the pointer for a given change in volume of the mercury in the bulb and the coils of said spring all lying in substantially the same plane and being wound spirally one outside of and about another and arranged substantially coaxial with the dial and the indicating member being journalled about an axis extending within the turns of the spring whereby, at the same time, a more compact arrangement of parts is obtained without deleteriously affecting the thermometric efficiency of the device.

In testimony whereof I have signed my name to this specification.

WILLIAM G. ZIEGLER.